UNITED STATES PATENT OFFICE.

HENRY S. MYERS, OF BROOKLYN, NEW YORK.

PROCESS OF PREPARING ORES FOR AMALGAMATION.

SPECIFICATION forming part of Letters Patent No. 447,344, dated March 3, 1891.

Application filed April 7, 1888. Serial No. 269,966. (No specimens.)

*To all whom it may concern:*

Be it known that I, HENRY S. MYERS, a citizen of the United States, residing at Brooklyn, in the county of Kings, in the State of New York, have invented a certain new, useful, and important Process of Preparing Ores for Amalgamation, of which the following is a specification.

My invention consists in treating the ores of gold and silver so that the metals contained in the ores will be cleaned and prepared for perfect amalgamation.

While the process may be applied to all gold-bearing ores and to many silver-bearing ores, it is more particularly designed for such as are known as "refractory ores"—that is, ores which contain matters or substances which prevent or interfere with the amalgamation of the metals, such as sulphur, arsenic, tellurium, and the like.

My invention consists in taking the ore after it is broken into small pieces or pulverized and wetting or saturating it with a solution of muriate of ammonia. About five pounds of muriate of ammonia dissolved in a quantity of water sufficient to saturate a ton of ore will generally answer the purpose; but a stronger solution, if desired, may be made. For the muriate of ammonia, borax or equivalent substances may be substituted. When the broken or pulverized ore has been thus treated it is then roasted in any kind of furnace adapted for the roasting of ores, preferably such a furnace as will admit of agitating or stirring the ore and of the free passage of atmospheric air through it while the roasting is progressing. The degree of heat required for the proper roasting of the ore largely depends upon the nature or character of the ore. Thus ores consisting of a simple sulphuret of iron containing gold require but a moderate heat, or such as will liberate or dissipate the sulphur, such as contain sulphuret of copper and the like require that care be taken not to apply such a heat as will render the copper, or the like, metallic, and such as contain tellurium require a very high heat. After the ore has been roasted, as described, it is then made wet or saturated with a mixture of sulphuric acid and water, about four parts of water to one part of acid, more or less acid being used, according to the character of the ore. After the ore has been saturated with this mixture of acid and water it is allowed to stand in that condition for some time, being stirred up occasionally to facilitate the action of the acid mixture. Other acids or corrosive substances may be substituted for the sulphuric-acid mixture in the treatment of certain ores. By the means herein described the particles of metal disseminated throughout the ore are cleaned of any adhering substances and prepared for easy and perfect amalgamation. The ore is then amalgamated with mercury by any of the known methods of amalgamation, and the mercury or amalgam, which now contains the metal, is then collected and retorted and the metal obtained in a state of purity or closely approximating purity.

What I claim as new, and desire to secure by Letters Patent, is—

The method of chemically treating gold and silver ores in order to clean the particles of metal from any adherent substances which interfere with amalgamation, said method consisting in wetting the broken or pulverized ores before roasting with a solution of muriate of ammonia or the like, and then after roasting wetting the ores so treated with a mixture of sulphuric acid and water or the like, whereby the particles of metal are prepared for perfect amalgamation.

In testimony whereof I have hereunto set my hand and seal, in the presence of two witnesses, at Stapleton, Staten Island, in the county of Richmond and State of New York, the 4th day of April, 1888.

HENRY S. MYERS. [L. S.]

In presence of—
WM. M. WERMERSKIRCH,
S. NIERSCH.